(12) United States Patent
Lin et al.

(10) Patent No.: US 8,422,573 B2
(45) Date of Patent: Apr. 16, 2013

(54) TRANSMITTING DEVICE

(75) Inventors: Hung-Ming Lin, Hsin Chu (TW);
Hung-Ju Huang, Hsinchu (TW);
Fu-Chou Hsu, Hsinchu (TW)

(73) Assignee: ASPEED Technology Inc., Hsinchu (TW)

( * ) Notice: Subject to any disclaimer, the term of this patent is extended or adjusted under 35 U.S.C. 154(b) by 917 days.

(21) Appl. No.: 12/504,280

(22) Filed: Jul. 16, 2009

(65) Prior Publication Data
US 2011/0013705 A1    Jan. 20, 2011

(51) Int. Cl.
*H04K 1/10* (2006.01)
*H03D 3/00* (2006.01)
*H04J 3/16* (2006.01)

(52) U.S. Cl.
USPC ............... 375/260; 375/335; 370/468

(58) Field of Classification Search ......... 375/260, 375/335; 370/468
See application file for complete search history.

(56) References Cited

U.S. PATENT DOCUMENTS

| | | | |
|---|---|---|---|
| 6,904,110 B2 * | 6/2005 | Trans et al. | 375/350 |
| 2001/0038674 A1 * | 11/2001 | Trans | 375/355 |
| 2001/0055311 A1 * | 12/2001 | Trachewsky et al. | 370/445 |
| 2002/0006136 A1 * | 1/2002 | Mallory et al. | 370/466 |
| 2002/0027886 A1 * | 3/2002 | Fischer et al. | 370/255 |
| 2002/0041570 A1 * | 4/2002 | Ptasinski et al. | 370/252 |
| 2002/0057713 A1 * | 5/2002 | Bagchi et al. | 370/468 |
| 2002/0061012 A1 * | 5/2002 | Thi et al. | 370/352 |
| 2002/0080886 A1 * | 6/2002 | Ptasinski et al. | 375/295 |
| 2006/0041420 A1 * | 2/2006 | Martin et al. | 703/27 |

* cited by examiner

*Primary Examiner* — Leon-Viet Nguyen
*Assistant Examiner* — Sarah Hassan
(74) *Attorney, Agent, or Firm* — Muncy, Geissler, Olds & Lowe, PLLC

(57) ABSTRACT

The invention discloses a transmitting apparatus. The transmitting apparatus uses the same transmission medium to transmit two signals that are within different frequency ranges at the same time. The transmitting apparatus increases the transmitting paths of the transmission medium so as to enhance the use of the transmission medium and save the production costs.

23 Claims, 12 Drawing Sheets

TRANSMITTING DEVICE

BACKGROUND OF THE INVENTION (a) Field of the Invention

The present invention relates to a transmitting apparatus and more particularly to a method and an apparatus that can increase the means of signal transmission in an existing transmitting apparatus.

(b) Description of the Related Art

Currently, the data transmission between the host side and the client side of the Ethernet transmitting apparatus utilizes a physical layer circuit to transmit and receive data signals. As the information technologies evolve continuously, not only the types of data and the data volume to be transmitted are increasing more and more but also the nature and the functionalities of the data are changing more and more. Since there is usually only one single signal transmitting path between the physical layer circuits in the prior art, the connection between the host side and the client side will be interrupted when the network is unstable while data signals are transmitted and received through the physical layer circuits. Thus, the user is often unable to accurately transmit necessary information through such a signal transmitting path so that accurate data transmission and control become impossible. Therefore, the user faces inconveniences while using such a signal transmitting path.

BRIEF SUMMARY OF THE INVENTION

In light of the above-mentioned problems, one object of the invention is to provide a transmitting apparatus that is capable of increasing the signal transmitting path under the premise of not increasing the network line.

One object of the invention is to provide a transmitting apparatus that the transmitting apparatus may communicate with other transmitting apparatus without using the physical layer circuit.

One other object of the invention is to provide a transmitting apparatus that can transmit additional signals over the same transmission medium without impacting the existing signal transmission of the physical layer circuit.

One embodiment of the invention provides a transmitting apparatus comprising a transformer, a transmitting unit, and a control unit.

The transformer comprises a primary side and a secondary side for performing signal transformation between the signal of the primary side and the signal of the secondary side. The transmitting unit is coupled to the primary side of the transformer for generating a first data signal and transmitting the first data signal to the primary side or receiving the first data signal from the primary side. The first data signal is operated within a first frequency range. The control unit is coupled to the secondary side of the transformer for generating a second data signal and transmitting the second data signal to the secondary side or receiving the second data signal from the secondary side. The second data signal is operated within a second frequency range. The first frequency range is different from the second frequency range whereas the second data signal and the first data signal are transmitted simultaneously via the same transmission medium.

The transmitting apparatus according to the embodiment of the invention can transmit data signals of different frequencies over the existing transmission medium. The transmission medium not only can facilitate bi-directional communication between the host side and the client side but also can provide another signal transmitting path to have the existing twisted pair cable achieve more functions.

DETAILED DESCRIPTION OF THE INVENTION

Figure 1A:
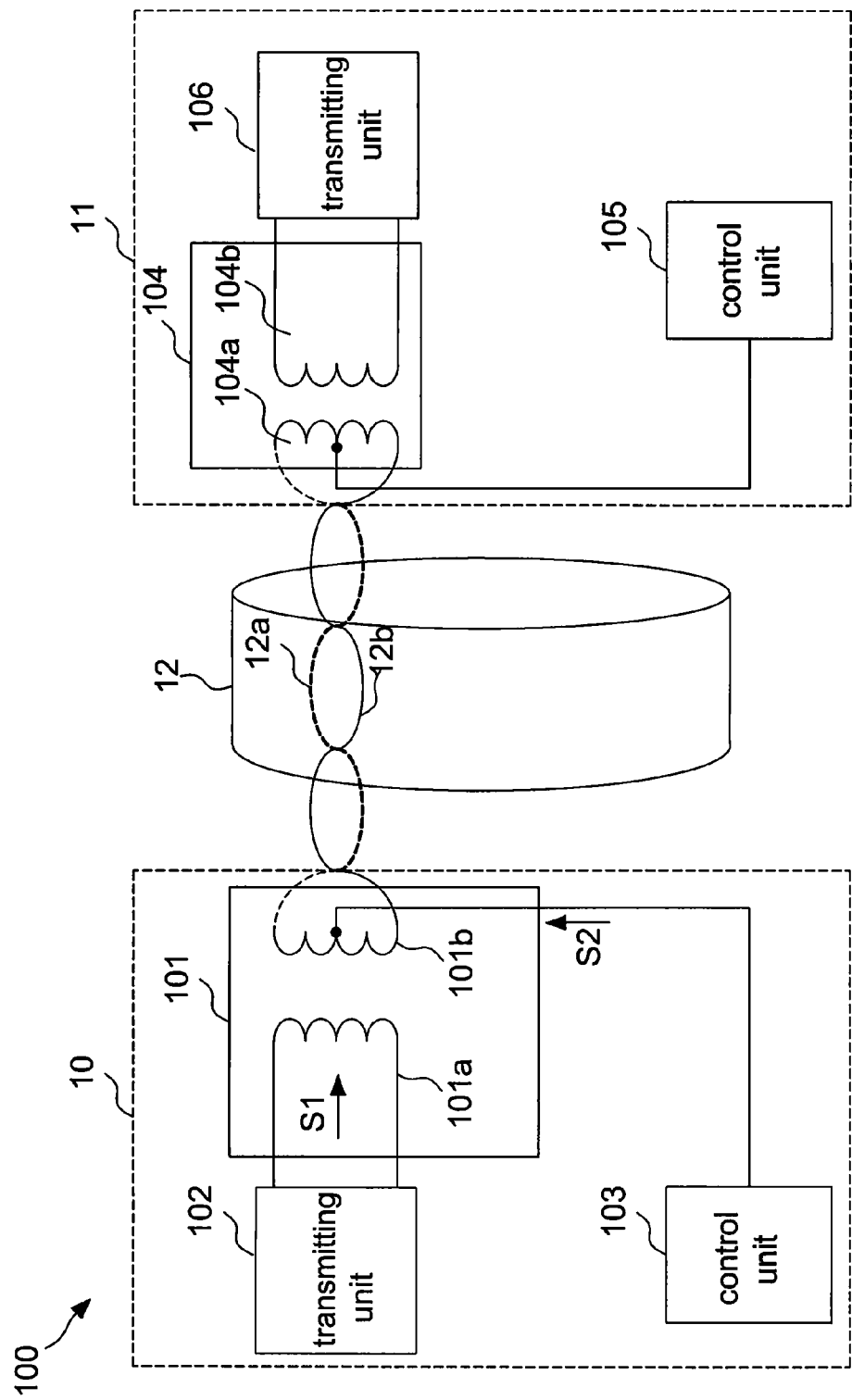
FIG. 1A shows a schematic diagram illustrating the transmitting apparatus according to one embodiment of the invention.

FIG. 1A shows a schematic diagram illustrating the transmitting apparatus according to one embodiment of the invention. In this embodiment, the transmitting apparatus 100 comprises a host side 10, a client side 11, and a transmission medium 12.

The host side 10 comprises a transformer 101, a transmitting unit 102, and a control unit 103. The transformer 101 comprises one primary side 101a and one secondary side 101b. The transformer 101 is to transform the signal that passes through the primary side 101a and to output the transformed signal to the secondary side 101b.

The transmitting unit 102 is coupled to the primary side 101a of the transformer 101 for transmitting the first data signal S1 generated by the transmitting unit 102 to the primary side 101a of the transformer 101. In one embodiment, the first data signal S1 can be a signal compliant with the IEEE 802.3 standards for providing data to the client side 11. In another embodiment, the first data signal S1 is operated within a first frequency range F1 and is substantially a high frequency signal.

The control unit 103 is coupled to the secondary side 101b of the transformer 101 for generating a second data signal S2 and transmitting the second data signal S2 to the secondary side 101b of the transformer 101. In one embodiment, the second data signal S2 can be a control signal for controlling the operation of the client side 11. The second data signal S2 is operated within a second frequency range F2 and is substantially a low frequency signal. What is to be noted is although the control unit 103 or 105 in this embodiment of the invention is coupled to the center tap of the secondary side 101b or 104a of the transformer 101 or 104, the method or the position of coupling to the secondary side 101b or 104a of the transformer 101 or 104 can be changed according to the applications to be developed in the future and the invention is not limited by these examples.

In one embodiment, the transmitting unit 102 of the transmitting apparatus 100 can be implemented by a physical layer transceiver. It should be noted that the transmitting unit 102 is applicable to a current modulator-demodulator (modem), IP sharing device, router, network card, or the like or to a network transmitting apparatus to be developed in the future. Obviously, the architecture of the physical layer circuit of the transmitting unit 102 of the embodiment of the invention can be designed independently by the R&D personnel or designed together with the control unit 103.

Figure 1B:
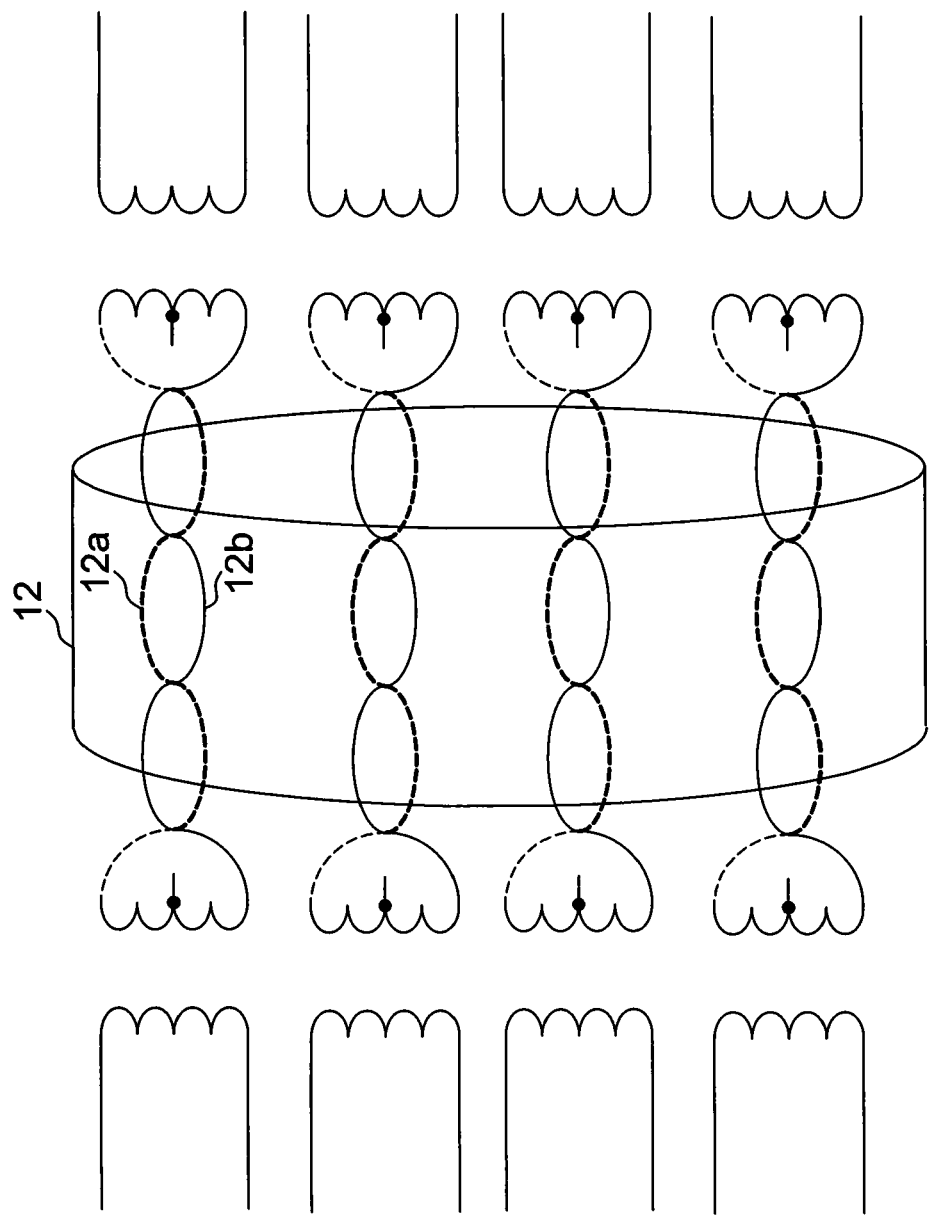
FIG. 1B shows a schematic diagram illustrating the transmitting apparatus according to one embodiment of the invention.

In one embodiment, the transmission medium 12 can utilize twisted-paired wires for transmission. For example, the transmission medium 12 can be the popularly existing transmission lines in compliance with the CAT-6, CAT-5e, and CAT-5 standards. Obviously, the applications of the invention are not limited by these examples and the transmission medium 12 can comprise various existing transmission lines or transmission lines to be developed in the future. For example, as shown in FIG. 1B, the transmission medium is a transmission line in compliance with the CAT-5 standard and comprises four twisted-paired wires where each twisted-paired wire comprises a first transmitting path 12a (shown by the dashed lines) and a second transmitting path 12b. Both of the two transmitting paths 12a, 12b can receive the first data signal S1 and the second data signal S2 and transmit the first data signal S1 and the second data signal S2 to the client side 11. For simplicity, only one twisted-paired wire and its related circuit is shown in FIG. 1A.

Figure 1C:
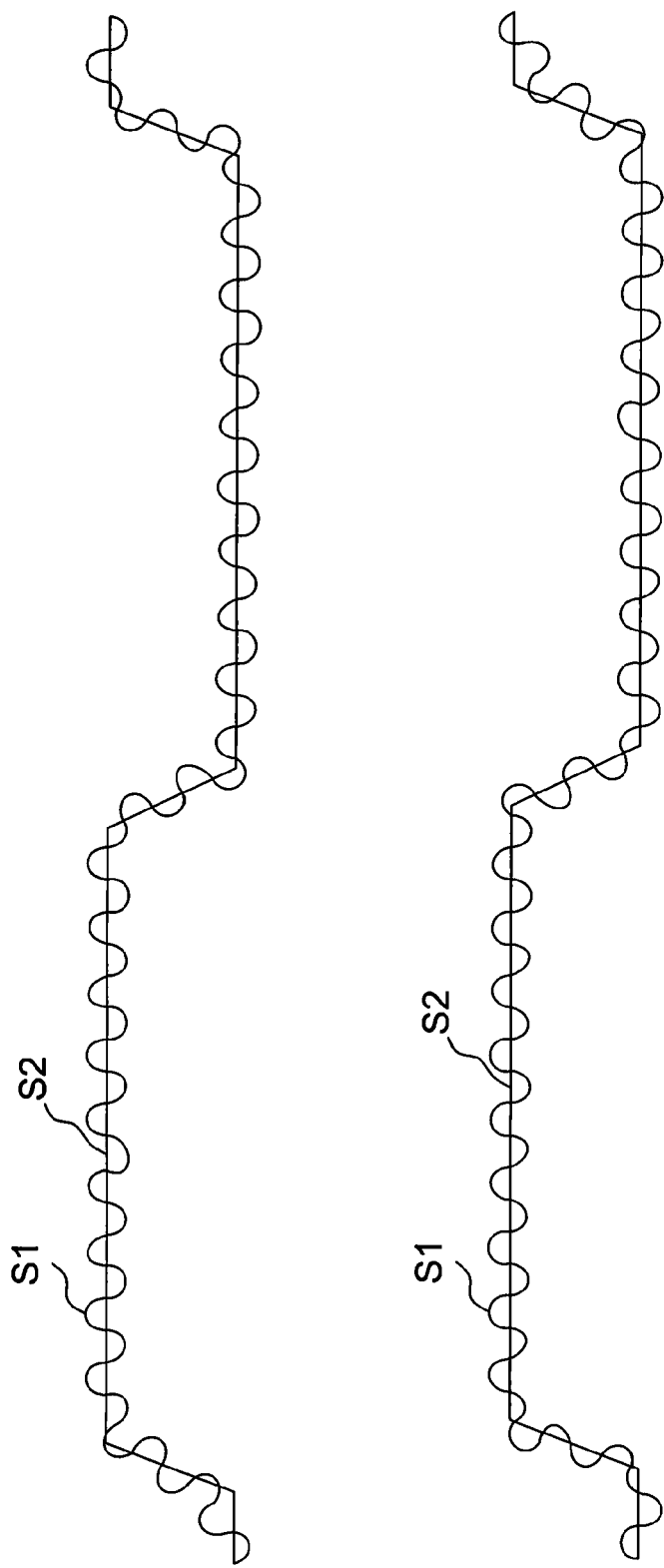
FIG. 1C shows a schematic diagram illustrating the signal transmission of the transmitting apparatus shown in FIG. 1A.

Please refer to FIGS. 1A and 1C simultaneously. FIG. 1C shows a schematic diagram illustrating the signal transmission of the transmitting apparatus shown in FIG. 1A. It should be noted although only the data signals S1, S2 transmitting from the host side 10 to the client side 11 are shown in FIG. 1C, the client side 11 can also transmit the data signals S1, S2 to the host side 10 correspondingly.

The first data signal S1 generated by the transmitting unit 102 can be a differential signal. In one embodiment, the control unit 103 can be a sideband signal driver. The second data signal S2 generated by the control unit 103 can be a single-ended signal. Besides, the control unit 103 is coupled to the center tap of the secondary side 101b. When the signal transition is generated by the control unit 103 or when the control unit 102 or the control unit 103 is interfered by the electromagnetic interference (EMI), the interfering noise will be transmitted separately by the first transmitting path 12a and the second transmitting path 12b of the transmission medium 12. Since the noise signals on the two transmitting paths are of substantially the same amplitude and substantially the same phase, the noise signals cancel each other out as the signal polarities of the two paths are substantially reverse to each other. Therefore, the second data signal S2 will not have any influence on the first data signal S1 transmitted originally by the transmission medium 12 under any circumstances. It should be noted that the second data signal S2 generated by the control unit 103 can also be a differential signal, in another embodiment.

Furthermore, the first data signal S1 is operated within the first frequency range F1 while the second data signal S2 is operated within the second frequency range F2. In one embodiment, the first frequency range F1 is within a high frequency range, such as 1 GHz, and the second frequency range is within a frequency range that is far less than the first frequency range F1, such as 10 KHz. Therefore, the first data signal S1 and the second data signal S2 can be simultaneously carried and transmitted by the transmission medium 12. For example, in this embodiment, the transmitting unit 102 transmits the first data signal S1, a high frequency signal, to the primary side 101a of the transformer 101 and, after voltage conversion, the first data signal S1 is outputted from the secondary side 101b. Then, the data is transmitted to the client side 11 via the transmission medium 12. The control unit 103 transmits the second data signal S2, a low frequency signal, to the center tap of the secondary side 101b of the transformer 101 and then it is transmitted to the client side 11 via the transmission medium 12. It should be noted since the transformer 101 is an AC coupling device, the low frequency signal inputted to the center tap of the secondary side 101b will not be transmitted to the primary side 101a of the transformer 101 and thus will not affect the transmitting unit 102 and the network data signal transmitted by the transmitting unit 102.

Thus, the control unit 103 can transmit additional signals to the client side along the same path of transmitting the network data signal to accomplish various special functions without additional cabling. Significant cost reduction can be achieved and various additional functions are provided. For example, in the prior art, when the network signal is not stable, the control unit of the transmitting apparatus according to the embodiment of the invention can be utilized to provide the control signal to the control unit of the client side along the same path of the network transmission for communicating and controlling the transmitting unit of the client side. Therefore, the problems in the prior art are solved.

Furthermore, the client side 11 of the transmitting apparatus 100 according to this embodiment of the invention comprise a transformer 104, a control unit 105, and a transmitting unit 106. The transformer 104 comprises one secondary side 104a and one primary side 104b. The secondary side of the transformer 104 is to transform the signal received from the secondary side 104a and output it via the primary side 104b or to transform the signal inputted from the primary side 104b and output it via the secondary side 104a. The control unit 105 is coupled to the center tap of the secondary side 104a of the transformer 104 for receiving the second data signal S2. The transmitting unit 106 is coupled to the primary side 104b of the transformer 104 for receiving or generating the first data signal S1. In one embodiment, the control unit 105 of the client side 11 can be implemented by a sideband signal receiver. The transmitting unit 106 can comprise physical layer circuits. Furthermore, although the above descriptions are about the host side 10 transmitting signals to the client side 11, bi-directional communication between the host side 10 and the client side 11 or the client side 11 transmitting signals to the host side 10 can all be performed according to the embodiment of the invention. The control units 103 and 105 can also perform bi-directional communication by utilizing the second data signal S2 generated by the control unit.

Furthermore, the second data signal S2 according to the embodiment of the invention is a signal, either a digital or analogue signal for assisting the communication between the host side 10 and the client side 11, but is not power and is different from the power supplying technology.

From the architecture and the signals shown in FIGS. 1A and 1C, when there are more than two transmitting apparatuses 100, the same twisted-paired wires can be utilized to transmit signals, that are operated within different frequency ranges, to be transmitted by the transmitting apparatus 100. For example, when a data signal S1 (such as: a data signal in compliance with the IEEE 802.3 standard) and a second data signal S2 (it can be a serial communication signal such as an I2C signal) at the host side 10 need to be transmitted to the client side 11, the data signal S1 can be outputted to the primary side 101a of the transformer 101 by the transmitting unit 102 of the host side 10 and the second data signal S2 can be outputted to the secondary side 101b of the transformer 101 by the control unit 103 of the host side 10. Then, the data signal S1 and the second data signal S2 can be simultaneously transmitted to the client side 11 via the transmission medium 12 and are separately received by the transmitting unit 106 and the control unit 105 of the client side 11. Since the operating frequency of the data signal S1 is about millions of Hertz (Mega Hz) and the operating frequency of the second data signal S2 is about several thousands of Hertz (KHz), the signals are operated within different frequency ranges. Therefore, the transmitting apparatus 100 according to the embodiment of the invention can transmit two or more signals via a single twisted-paired wire.

Figure 2A:
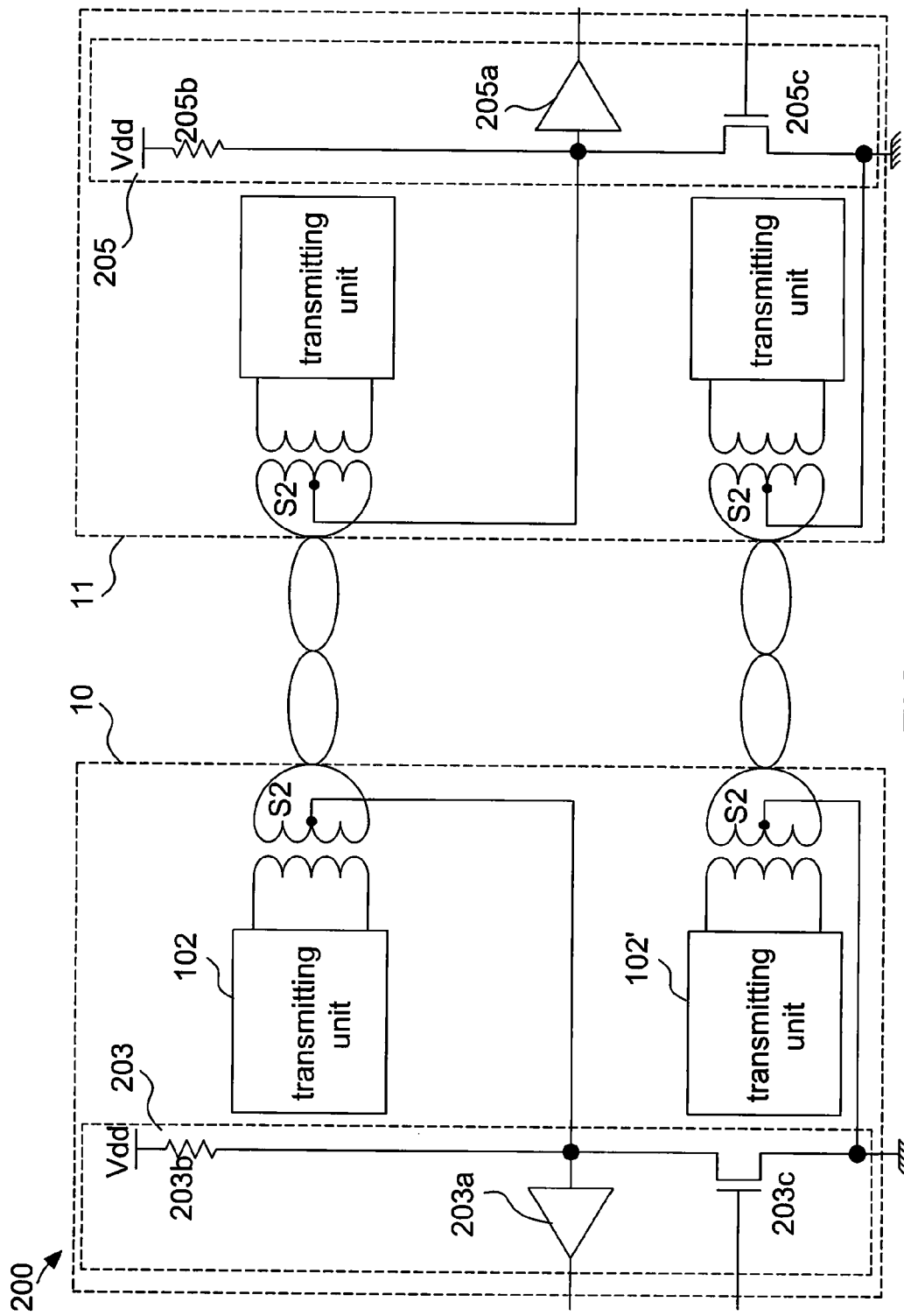
FIG. 2A shows a schematic diagram illustrating the transmitting apparatus according to one embodiment of the invention.
Figure 2B:
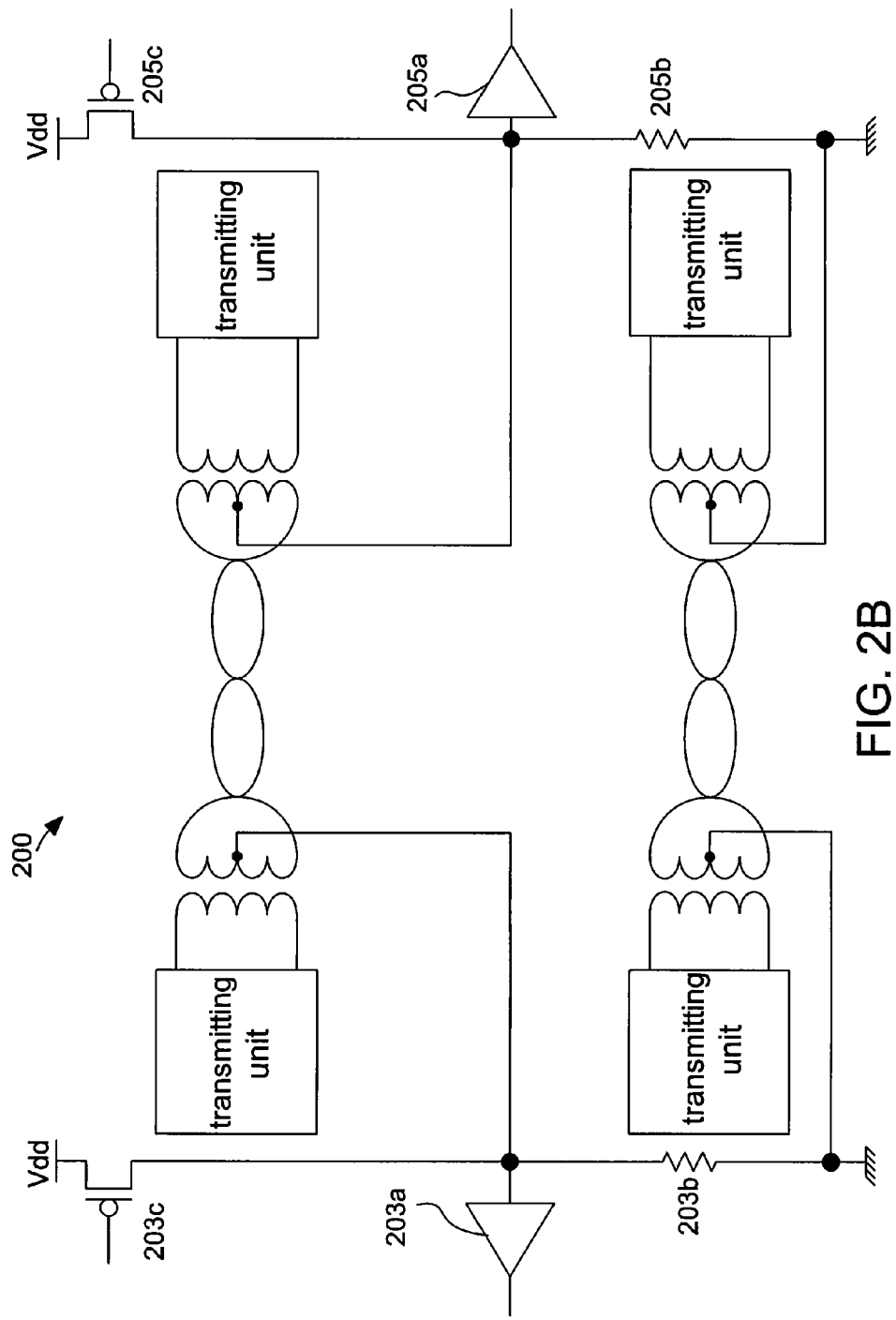
FIG. 2B shows a schematic diagram illustrating the transmitting apparatus according to one embodiment of the invention.

FIG. 2A shows a schematic diagram illustrating the transmitting apparatus 200 according to one embodiment of the invention. The transmitting apparatus 200 is designed for open drain bi-directional signal transmission. The control unit 203 of the host side 10 comprises a receiver 203a, a resistor 203b, and a transistor 203c. The control unit 205 of the client side 11 comprises a receiver 205a, a resistor 205b, and a transistor 205c. The resistors 203b, 205b according to this embodiment of the invention are pull-up resistors. In another embodiment, the resistors 203b, 205b shown in FIG. 2B are pull-down resistors. Obviously, according to the embodiments of the invention, the resistors can be designed by various types of transistors. In addition, the above-mentioned transistors can be implemented by various types of transistors that are currently available or to be developed in the future.

Please refer to FIG. 2A. One terminal of the resistor 203b of the control unit 203 is coupled to the voltage supply Vdd while the other terminal is coupled to the drain of the transistor 203c. The source of the transistor 203c is coupled to ground and the center tap of the secondary side of the transformer 102', the drain is coupled to the center tap of the secondary side of the transmitting unit 102, and the gate is to receive a control signal provided by other internal circuitries of the control unit 203. The receiver 203a can be an input/output (I/O) unit where the input terminal is coupled to the center tap of the secondary side of the transformer of the transmitting unit 102 as the receiving end for receiving the data signal S2 transmitted from the client side 11 to the host side 10. The output terminal of the receiver 203a is to transmit the data signal S2 to the other internal circuitries of the control unit 203.

Detailed descriptions of the operating principle of the transmitting apparatus 200 shown in FIG. 2A will be given hereinafter as one example. When the client side 11 is to provide a data signal S2 to the host side 10 via the center tap of the transformer, the control unit 203 of the host side 10 uses the receiver 203a to receive the data signal S2 via the center tap. The receiver 203a then provides the data signal S2 to the other internal circuitries of the control unit 203 for processing. When the host side 10 needs to control the client side 11 or to communicate with the client side 11, the other internal circuitries of the control unit 203 of the host side 10 provide a control signal to drive the gate of the transistor 203c for controlling the state of conduction of the transistor and generating a data signal S2 by working with the resistor 203 together. The data signal S2 is provided through the center tap of the transformer, the transmission medium, and the center tap of the transformer of the client side 11 to the control unit 205 of the client side 11 for achieving the effect of control or communication.

Further details should be understood by those who are skilled in the art from the figures and the above-mentioned descriptions. The operating principle and the architecture of the client side 11 are the same as the host side. The input terminal of the receiver 205a is the input terminal of the client side 11 for receiving the data signal S2 from the host side 10. The gate of the transistor 205c is the output terminal for the other internal circuitries of the control unit 205 of the client side 11 to provide the data signal S2 to the host side 10. According to the architecture of the circuit, both of the host side 10 and the client side 11 can utilize the original network data transmission path to transmit additional signals for bi-directional communication.

Figure 3A:
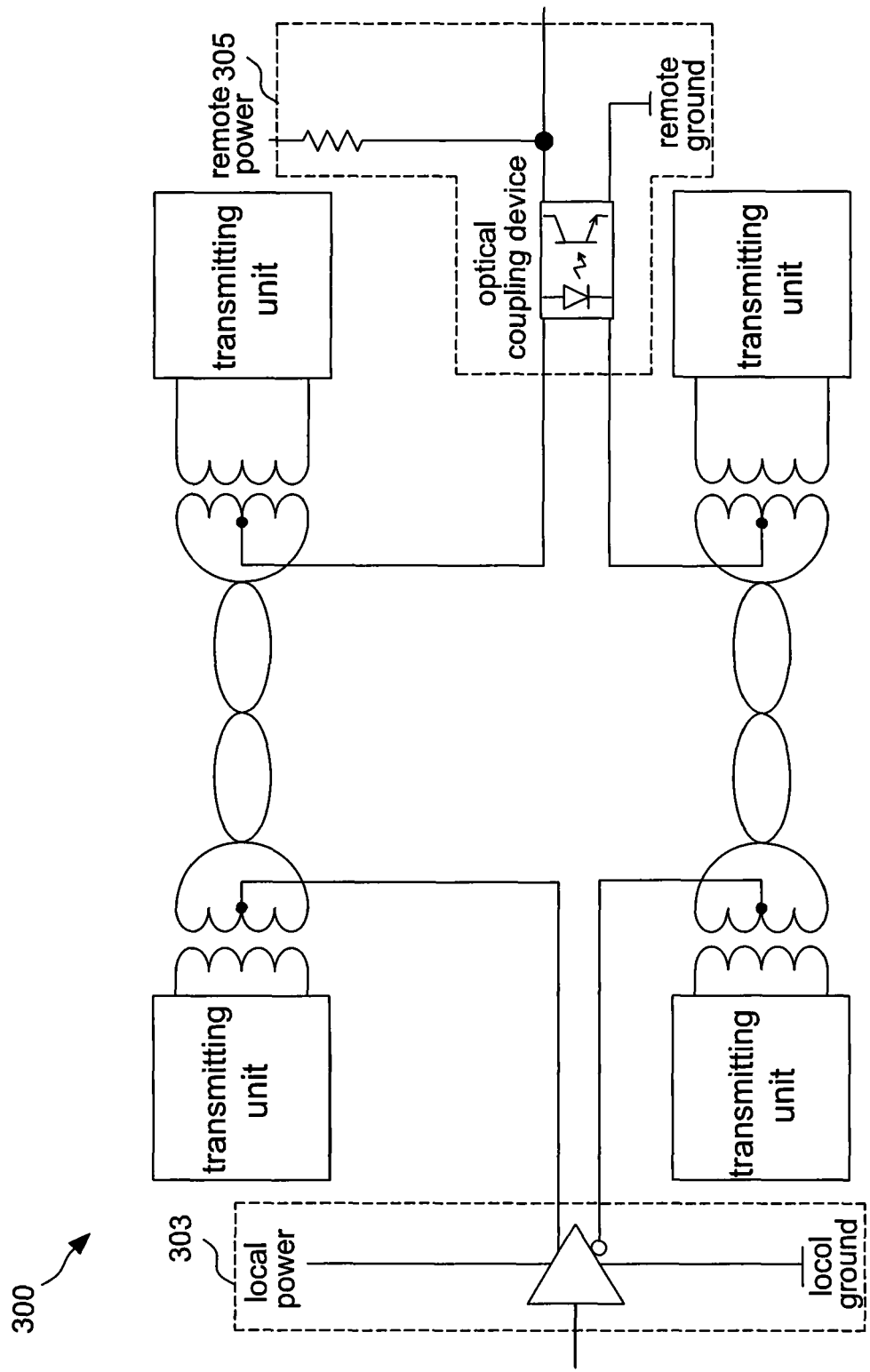
FIG. 3A shows a schematic diagram illustrating the transmitting apparatus according to one embodiment of the invention.
Figure 3B:
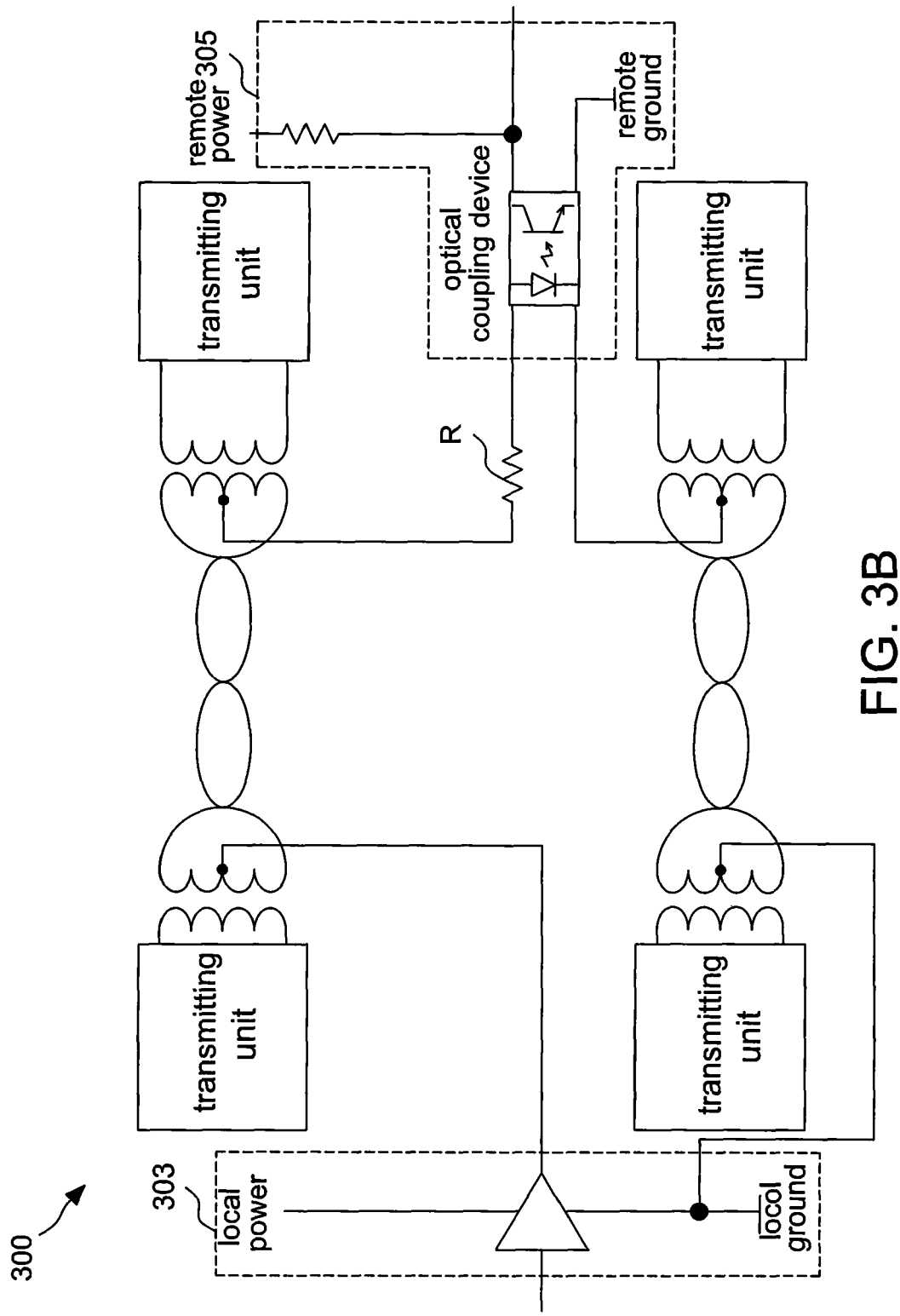
FIG. 3B shows a schematic diagram illustrating the transmitting apparatus according to one embodiment of the invention.

Please refer to FIG. 3A. FIG. 3A shows a schematic diagram illustrating the transmitting apparatus 300 according to one embodiment of the invention. The transmitting apparatus 300 is an optical coupled one-way differential signal transmitting apparatus. The receiver of the control unit 303 of the host side 10 utilizes a local power supply and outputs two signals with opposite polarities to the secondary sides of the two transmitting units. The control unit 305 of the client side 11 receives the two signals via the transmission medium (two twisted-paired wires) and then outputs them. An optical coupling device is provided in the client side 11 for maintaining good electrical isolation between the host side 10 and the client side 11 when the client side 11 receives the second data signal S2. It should be noted that the optical coupling device shown in the figure comprises an infrared LED and an NPN silicon photo sensor. The optical coupling device of the transmitting apparatus according to the embodiment of the invention can be implemented by various types of existing devices or devices to be developed in the future that are capable of providing electrical isolation. On the other hand, one-way single-ended transmission principle can also be utilized for the operation of the transmitting apparatus 300 according to the embodiment of the invention, as shown in FIG. 3B. A resistor can also be added to the front-end of the optical coupling device to improve the transmission performance.

Figure 4:
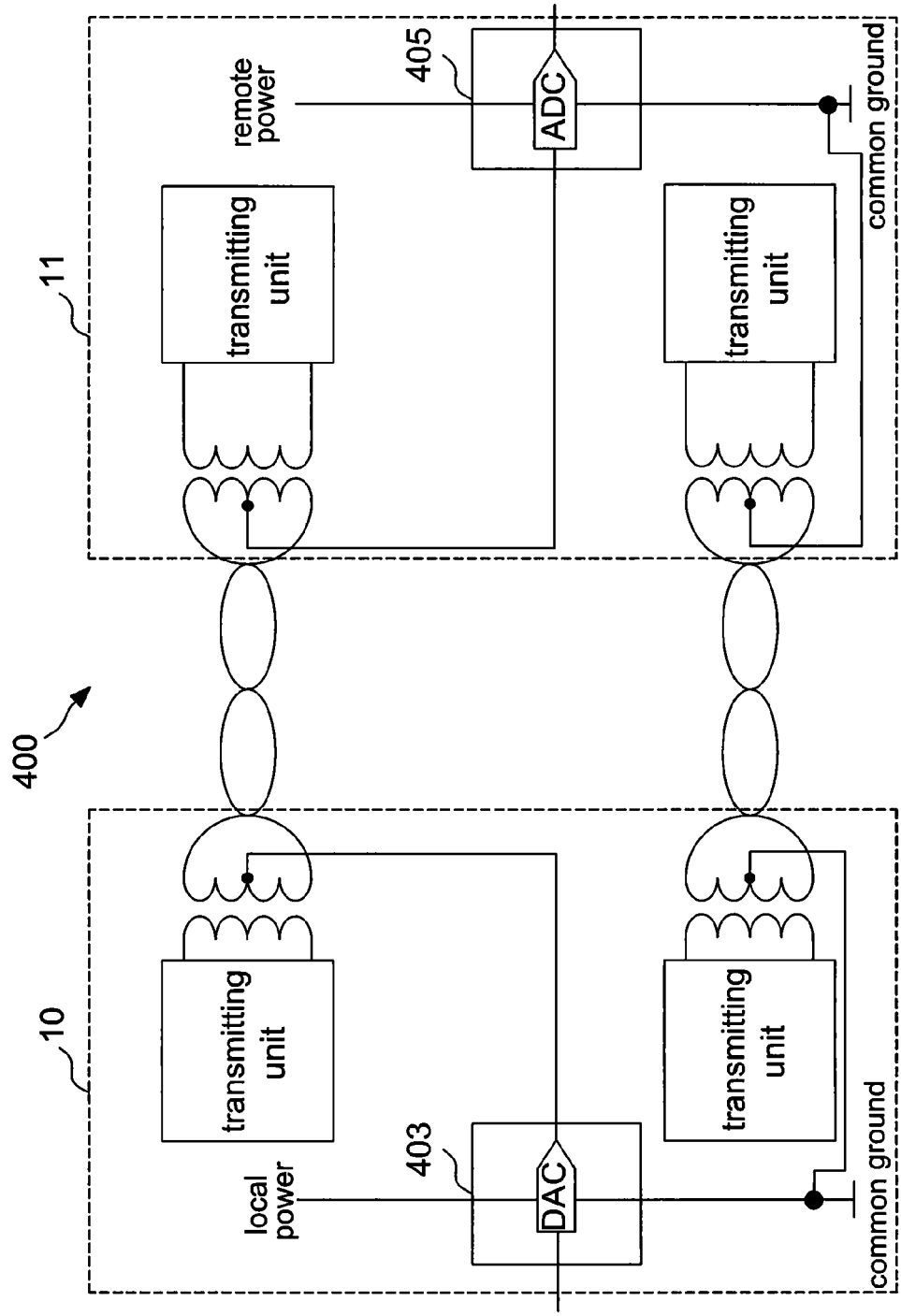
FIG. 4 shows a schematic diagram illustrating the transmitting apparatus according to one embodiment of the invention.

Please refer to FIG. 4. FIG. 4 shows a schematic diagram illustrating the transmitting apparatus 400 according to one embodiment of the invention. The transmitting apparatus 400 is an ADC/DAC one-way signal transmission device. The control unit 403 of the host side 10 is implemented by a digital-to-analog converter while the control unit 405 of the client side 11 is implemented by an analog-to-digital converter. Thus, the transmitting apparatus 400 according to the embodiment of the invention can utilize a single line to transmit multiple-bit data.

Figure 5:
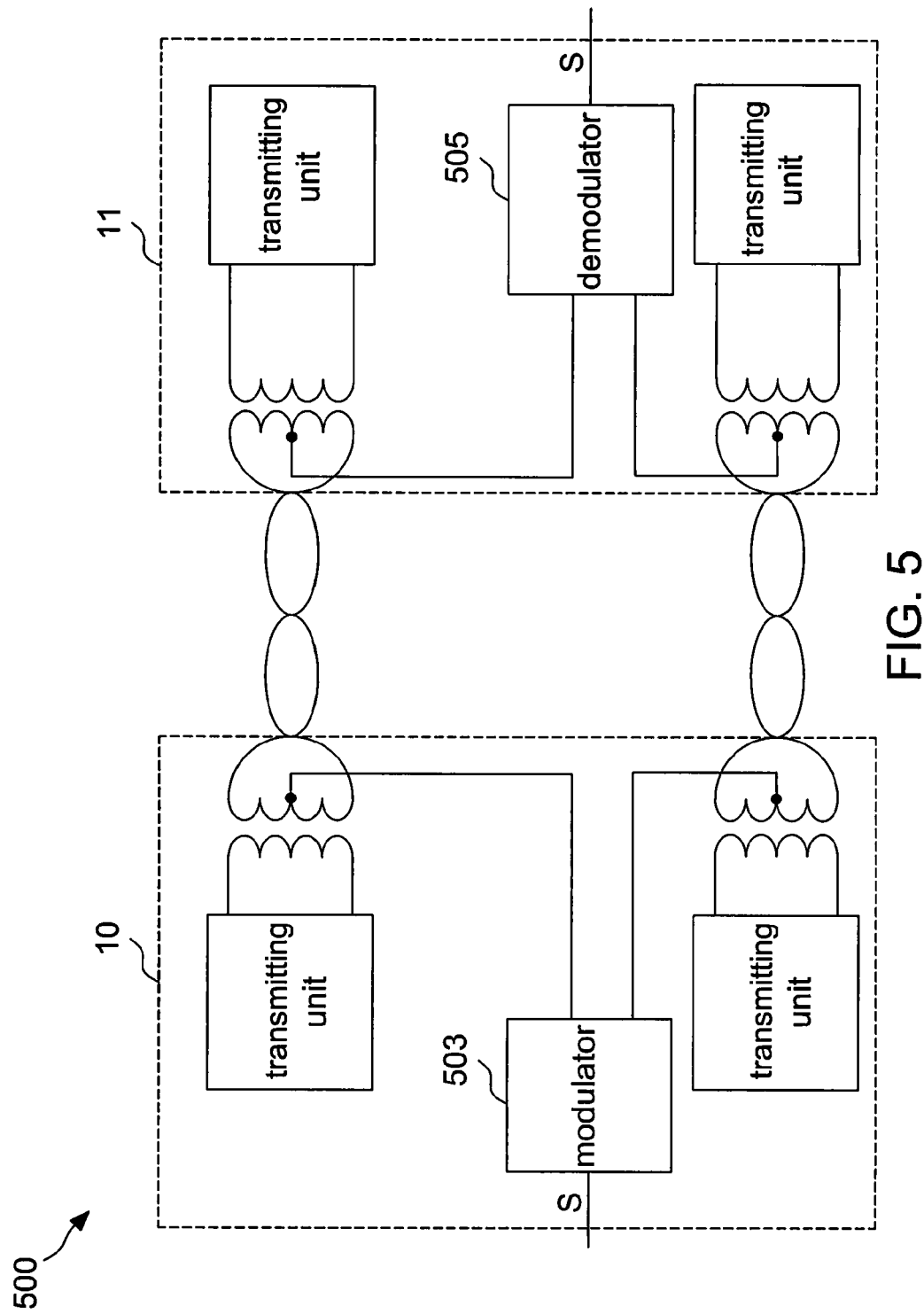
FIG. 5 shows a schematic diagram illustrating the transmitting apparatus according to one embodiment of the invention.

Please refer to FIG. 5. FIG. 5 shows a schematic diagram illustrating the transmitting apparatus 500 according to one embodiment of the invention. The transmitting apparatus 500 is a one-way signal modulation device. The control unit 503 of the host side 10 can be implemented by a modulator. The modulator can be a frequency modulator, an amplitude modulator, or a phase modulator or the like. The control unit 505 of the client side 11 can be implemented by the corresponding demodulator. The demodulator can be implemented by a frequency demodulator, an amplitude demodulator, or a phase demodulator.

Figure 6A:
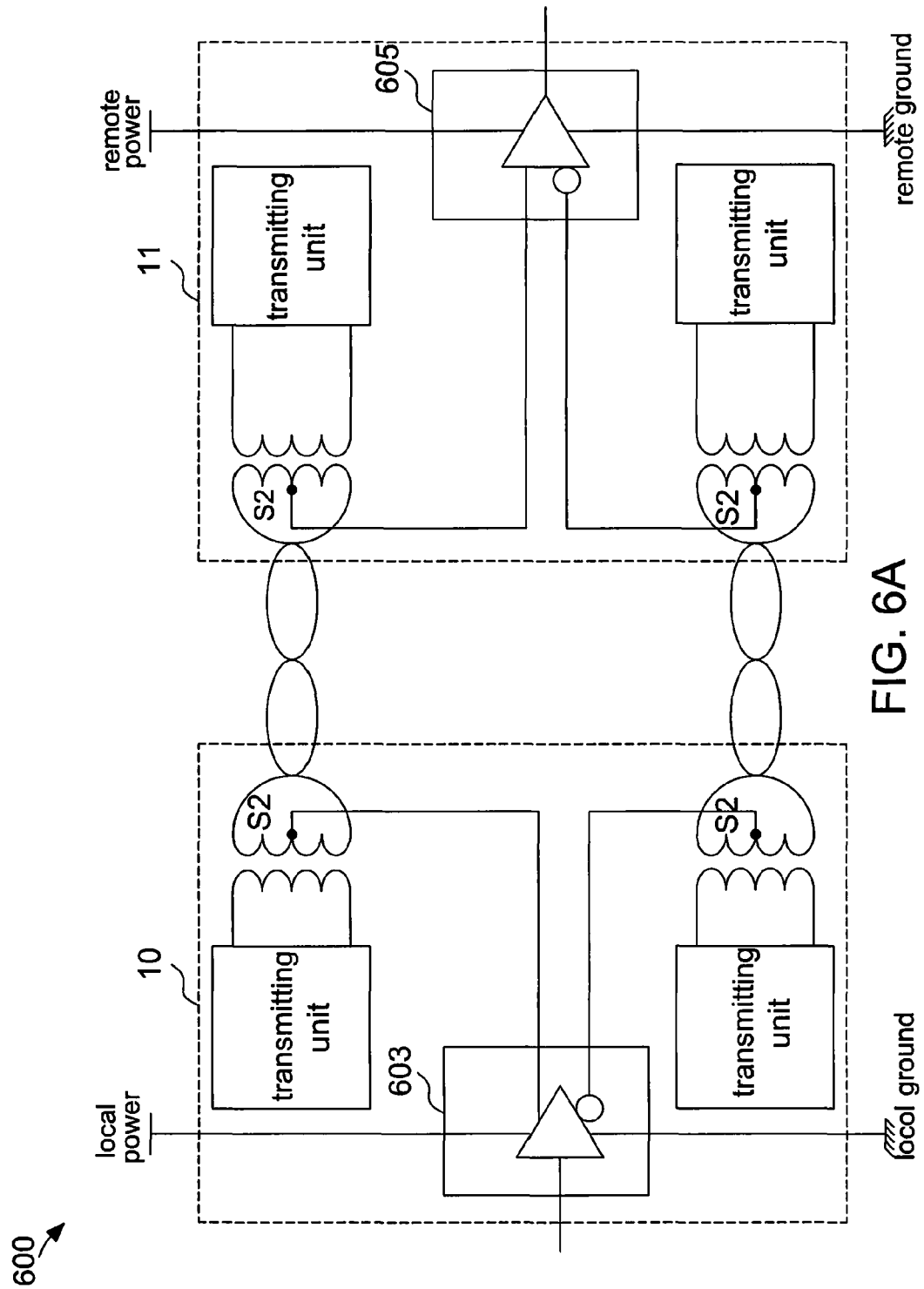
FIG. 6A shows a schematic diagram illustrating the transmitting apparatus according to one embodiment of the invention.

FIG. 6A shows a schematic diagram illustrating the transmitting apparatus 600 according to one embodiment of the invention. The transmitting apparatus 600 is one example of the differential signal one-way transmission. The control unit 603 of the host side 10 and the control unit 605 of the client side 11 each include a receiver. As shown in the figure, the second data signal S2 being transmitted is a differential signal and is transmitted from the host side 10 to the client side 11 via two sets of twisted-paired wires. In another embodiment, the direction of signal transmission can also be designed to be transmitted from the client side 11 to the host side 10.

Figure 6B:
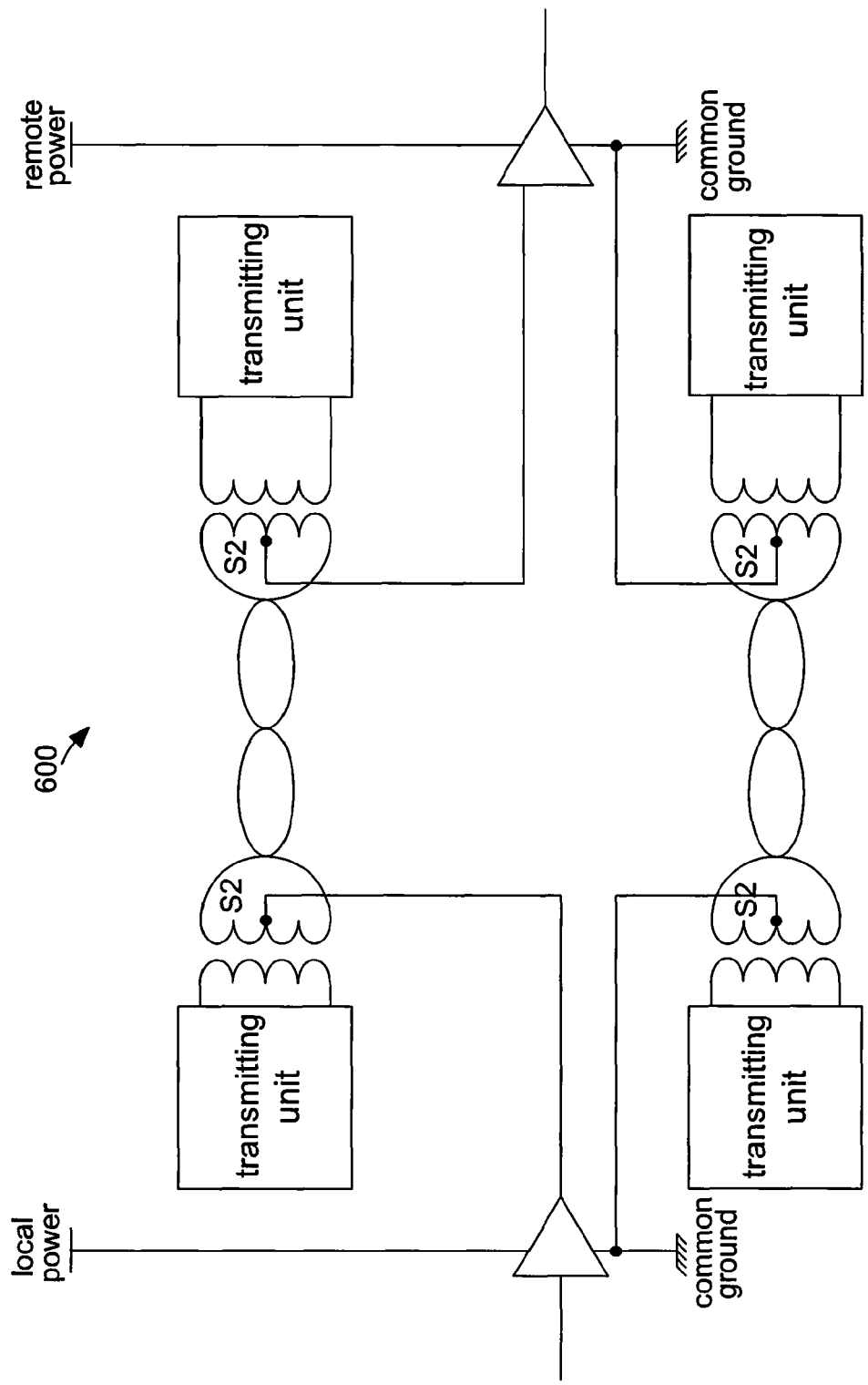
FIG. 6B shows a schematic diagram illustrating the transmitting apparatus according to one embodiment of the invention.

It should be noted that the transmitting apparatus 600 shown in FIG. 6B can also be designed to operate via the single-ended signal one-way transmission approach. The host side and the client side can be common grounded. Those who are skilled in the art should be able to understand its operating method through the above-mentioned descriptions. Thus, further details will not be given herein.

Figure 7:
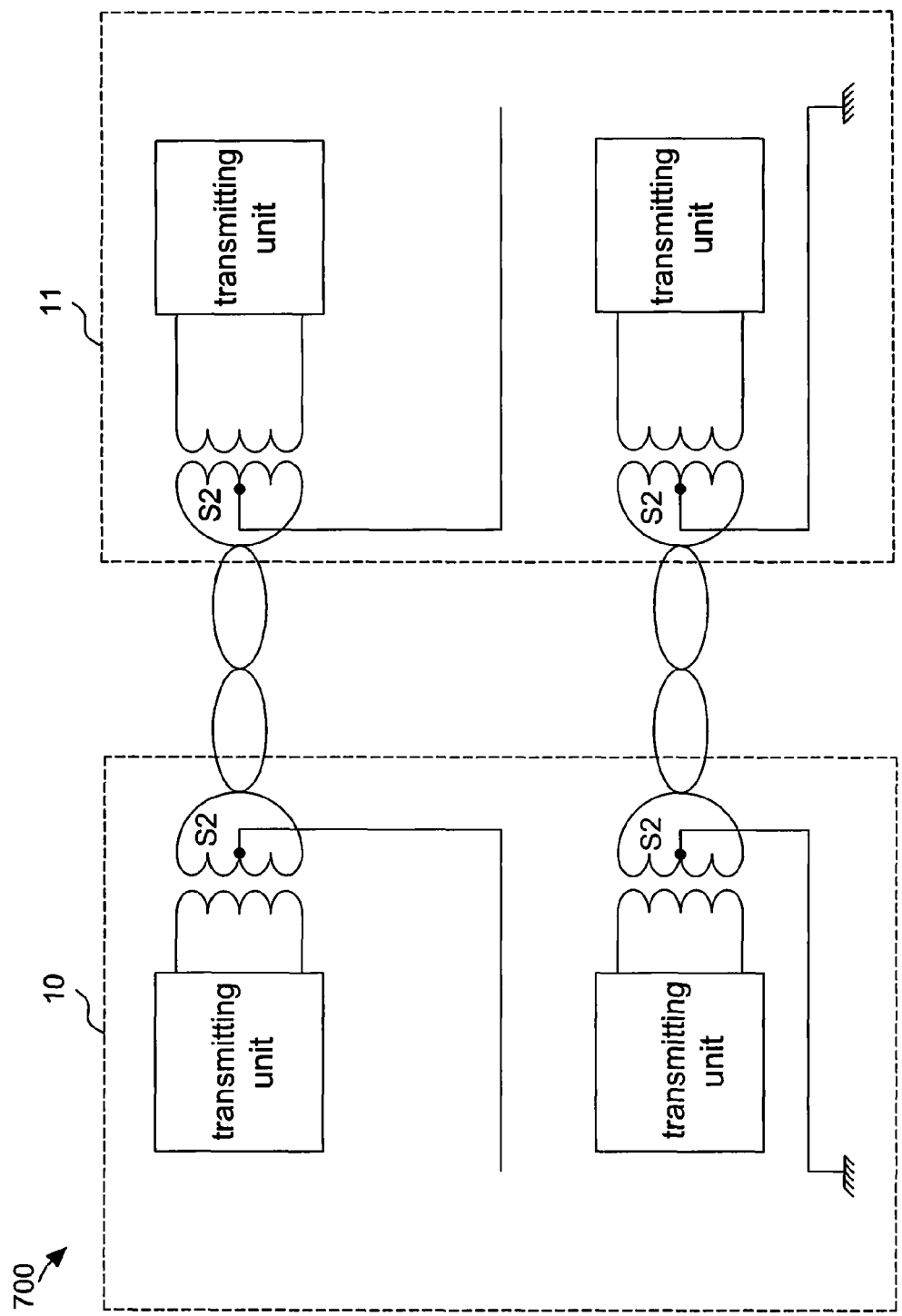
FIG. 7 shows a schematic diagram illustrating the transmitting apparatus according to one embodiment of the invention.

FIG. 7 shows a schematic diagram illustrating the transmitting apparatus 700 according to one embodiment of the invention. The transmitting apparatus 700 utilizes a pass-through signaling design approach. The transmitting apparatus 700 provides a signal conducting path between the host side and the client side that can be used by various circuitries in a variety of possible applications for increasing the circuit functions.

In conclusion, the transmitting apparatus according to the embodiment of the invention can transmit an additional sideband data signal over the existing transmission medium. The transmission medium not only can facilitate bi-directional communication between the host side and the remote client side but also can provide another signal transmitting path. The existing twisted pair cable can then provide a wide variety of functions. For example, an optical coupling path can be provided to the host side and the client side for transmitting or receiving control signals or transmitting or receiving data. A plurality of control and communication functions can then be achieved.

What is claimed is:

1. A transmitting apparatus, comprising:
   a transformer having a primary side and a secondary side for performing signal transformation between a signal of the primary side and a signal of the secondary side
   a transmitting unit coupled to the primary side of the transformer for generating a first data signal and transmitting the first data signal to the primary side or receiving the first data signal from the primary side, wherein the first data signal is operated within a first frequency range; and
   a control unit coupled to the secondary side of the transformer for generating a second data signal and transmitting the second data signal to the secondary side or receiving the second data signal from the secondary side;
   wherein the second data signal is operated within a second frequency range; and
   wherein the first frequency range is different from the second frequency range and the second data signal and the first data signal are transmitted via a transmission medium simultaneously.

2. The apparatus according to claim 1, wherein the first data signal is substantially a differential signal and the second data signal is substantially a single-ended signal.

3. The apparatus according to claim 1, wherein the signal transmitted by the control unit is not power.

4. The apparatus according to claim 1, wherein an optical coupling device is provided in the control unit.

5. The apparatus according to claim 1, wherein the first data signal is substantially a high-frequency signal and the second data signal is substantially a low-frequency signal.

6. The apparatus according to claim 1, wherein the control unit is coupled to the center tap of the secondary side of the transformer.

7. The apparatus according to claim 1, wherein the control unit is coupled to a pre-determined position of the secondary side of the transformer.

8. The apparatus according to claim 1, wherein the frequency of the first data signal is higher than the frequency of the second data signal.

9. The apparatus according to claim 1, wherein the control unit is a sideband signal driver.

10. The apparatus according to claim 1, wherein the control unit comprises:
    a receiver for receiving or outputting the second data signal;
    a resistor having one terminal coupled to a first power supply and the other terminal coupled to the input terminal of the receiver; and
    a transistor having a first terminal coupled to the other terminal of the resistor and a second terminal coupled to a second power supply for generating the data signal according to a control signal; and
    wherein the characteristics of the data signal are the same as those of the second data signal but are different from those of the first data signal.

11. The apparatus according to claim 10, wherein the resistor is a pull-up resistor or a pull-down resistor.

12. The apparatus according to claim 1, wherein the control unit is an analog-to-digital converter or a digital-to-analog converter.

13. The apparatus according to claim 1, wherein the control unit is a modulator or a demodulator.

14. A transmission apparatus, comprising:
    a host side, at least one transmission medium and at least one client side;
    wherein the host side comprises:
    a first transformer having a primary side and a secondary side for performing signal transformation between the signal of the primary side and the signal of the secondary side;
    a first transmitting unit coupled to the primary side of the first transformer for generating a first data signal of the host side and transmitting the first data signal to the primary side or receiving a first data signal of the client side, wherein the first data signal of the host side and the first data signal of the client side are operated within a first frequency range; and
    a first control unit coupled to the secondary side of the first transformer for generating a second data signal of the host side and transmitting the second data signal to the secondary side or receiving a second data signal of the client side, wherein the second data signal of the host side and the second data signal of the client side are operated within a second frequency range;
    wherein the at least one transmission medium is for receiving and transmitting simultaneously the first data signal of the host side and the second data signal of the host side or simultaneously transmitting the first data signal of the client side and the second data signal of the client side;
    wherein the at least one client side comprises:

a second transformer having a primary side and a secondary side for performing signal transformation between the signal of the primary side and the signal of the secondary side;

a second transmitting unit coupled to the primary side of the second transformer for receiving the first data signal of the host side or generating the first data signal of the client side; and a second control unit coupled to the secondary side of the second transformer for receiving the second data signal of the host side or generating the second data signal of the client side; and wherein the first frequency range is different from the second frequency range.

15. The apparatus according to claim 14, wherein the first data signal of the host side and the first data signal of the client side are substantially differential signals and the second data signal of the host side and the second data signal of the client side are substantially single-ended signals.

16. The apparatus according to claim 14, wherein the frequencies of the first data signal of the host side and the first data signal of the client side are higher than the frequencies of second data signal of the host side and the second data signal of the client side.

17. The apparatus according to claim 14, wherein the signals transmitted by the first control unit and the second control unit are not power.

18. The apparatus according to claim 14, wherein an optical coupling device is provided in one or both of the first control unit and the second control unit.

19. The apparatus according to claim 14, wherein the first data signal of the host side and the first data signal of the client side are substantially high-frequency signals and the second data signal of the host side and the second data signal of the client side are substantially low-frequency signals.

20. The apparatus according to claim 14, wherein the first control unit and the second control unit are coupled to the center taps of the secondary sides of the first transformer and the second transformer.

21. The apparatus according to claim 14, wherein the first control unit and the second control unit are coupled to a pre-determined position of the secondary sides of the first transformer and the second transformer.

22. The apparatus according to claim 14, wherein the first control unit is an analog-to-digital converter and the second control unit is a digital-to-analog converter.

23. The apparatus according to claim 14, wherein the first control unit is a modulator and the second control unit is a demodulator.

* * * * *